United States Patent [19]
Yahagi et al.

[11] Patent Number: 5,657,170
[45] Date of Patent: Aug. 12, 1997

[54] PHOTOGRAPHIC LENS APPARATUS

[75] Inventors: Satoshi Yahagi; Akiko Takatsuki, both of Omiya, Japan

[73] Assignee: Fuji Photo Optical Co., Ltd., Saitama-ken, Japan

[21] Appl. No.: 621,845

[22] Filed: Mar. 25, 1996

[30] Foreign Application Priority Data

Apr. 5, 1995 [JP] Japan .................... 7-080187

[51] Int. Cl.$^6$ .................. G02B 9/34; G02B 9/00
[52] U.S. Cl. .................. 359/774; 359/739
[58] Field of Search ..................... 359/755, 756, 359/757, 758, 764, 774, 788, 739, 789

Primary Examiner—Georgia Y. Epps
Assistant Examiner—Jordon M. Schwartz
Attorney, Agent, or Firm—Leydig, Voit & Mayer

[57] ABSTRACT

A photographic lens apparatus secures a sufficiently large back focus while sufficiently distancing the exit pupil position from the image-forming surface. From the object side along an optical axis L, a stop, a first lens, a second lens, a third lens having a meniscus form, and a fourth lens group, in which a lens having a negative refractive power and a lens having a positive refractive power are cemented together to yield a positive refractive power, are successively disposed. Refractive index $n_1$ and abbe number $v_1$ of the first lens, abbe number $v_2$ of the second lens, radius of curvature $r_7$ of the surface facing the object and radius of curvature $r_8$ of the surface facing the image in the third lens, abbe number $v_4$ of the lens having the negative refractive power and abbe number $v_5$ of the lens having the positive refractive power in the fourth lens group, focal length $f_{45}$ of the fourth lens group, and entire focal length f of the whole lens system satisfy the conditions $1.7 < n_1$, $40 < v_1 < 50$, $v_2 < 30$, $9 < (r_7+r_8)/(r_7-r_8) < 50$, $f_{45}/f < 1.20$, and $20 < v_5 - v_4$.

2 Claims, 3 Drawing Sheets

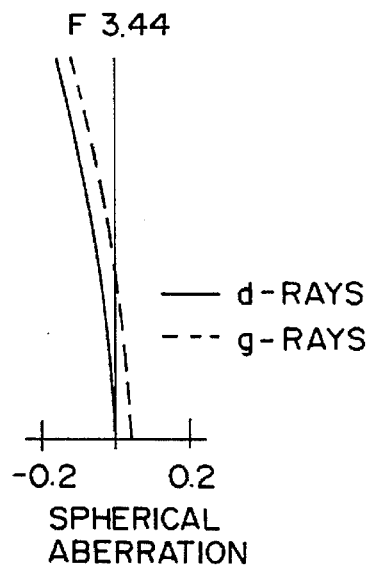
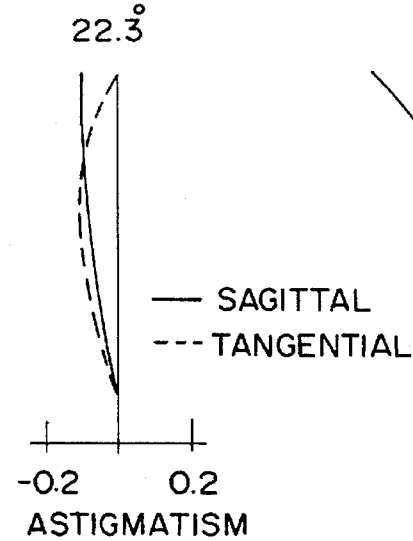
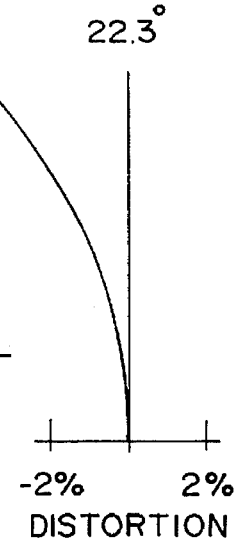
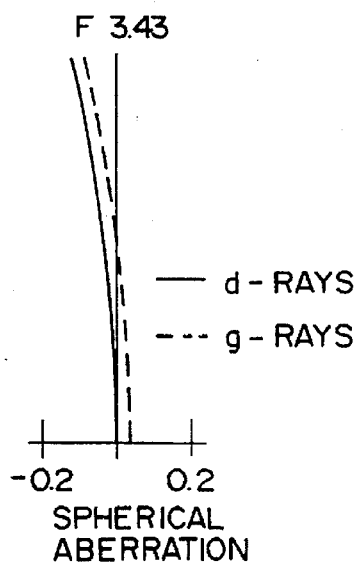
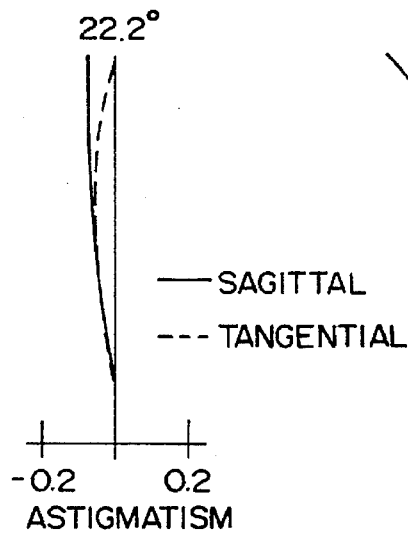
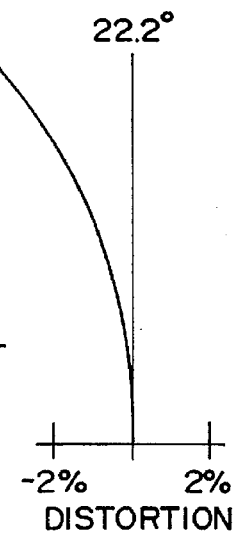

PHOTOGRAPHIC LENS APPARATUS

BACKGROUND OF THE INVENTION

1. Field of the Invention

The present invention relates to a fixed-focus type photographic lens apparatus used in video cameras or electronic still cameras and, in particular, to a photographic lens apparatus in which a stop is disposed between an object and lens groups.

2. Related Background Art

Video cameras and electronic still cameras are configured such that an image of an object formed by way of a photographic lens apparatus is captured by a solid-state image pickup device, while a minute lens is formed on the image pickup surface of the solid-state image pickup device so as to increase the light quantity received thereby.

Accordingly, it is necessary for the luminous flux entering the image pickup surface of the solid-state image pickup device from the photographic lens apparatus to have an incident angle as small as possible. In other words, it is desirable for the exit pupil position of the photographic lens apparatus to be as far as possible.

Also, since a low-pass filter for preventing moire or a filter for cutting infrared light has to be disposed between the solid-state image pickup device and the photographic lens apparatus, it has been necessary for the photographic lens apparatus to have a sufficiently long back focus.

In recent years, in response to a demand for smaller video cameras and electronic still cameras, the size of the solid-state image pickup element has been reduced to such a dimension as ⅓ inch or ¼ inch. Accordingly, there is a demand for further reducing the size of the photographic lens apparatus. However, when the photographic lens apparatus has a small size, it becomes difficult for its back focus and the distance between its image-forming surface and exit pupil to have sufficient values. Also, even when their sufficient values are secured, the optical performance of the apparatus may become insufficient.

SUMMARY OF THE INVENTION

In view of the foregoing problems, the object of the present invention is to provide a high-performance photographic lens apparatus which has a sufficiently large back focus as compared with the whole length of the photographic lens apparatus while sufficiently securing the distance between the image-forming surface and the exit pupil position.

In order to achieve such an object, the present invention provides a photographic lens apparatus constituted by four lens groups composed of five elements comprising, successively from the object side, a stop, a biconvex first lens, a biconcave second lens, a third lens having a meniscus form and a positive refractive power with a convex surface facing the image, and a fourth lens group in which a lens having a negative refractive power and a lens having a positive refractive power are cemented together to yield a positive refractive power; while refractive index $n_1$ of the first lens, abbe number $v_1$ of the first lens, abbe number $v_2$ of the second lens, radius of curvature $r_7$ of the surface of the third lens facing the object, radius of curvature $r_8$ of the surface of the third lens facing the image, abbe number $v_4$ of the lens having the negative refractive power in the fourth lens group, abbe number $v_5$ of the lens having the positive refractive power in the fourth lens group, focal length $f_{45}$ of the fourth lens group, and entire focal length f of the whole lens system comprising the four groups composed of five elements satisfy the following conditions (1) to (6):

(1) $1.7 < n_1$
(2) $40 < v_1 < 50$
(3) $v_2 < 30$
(4) $9 < (r_7 + r_8)/(r_7 - r_8) < 50$
(5) $f_{45}/f < 1.20$
(6) $20 < v_5 - v_4$

Further, in the above-mentioned photographic lens apparatus, a light-shielding plate for restricting a luminous flux having an intermediate angle of view may be disposed between the stop and the first lens.

In the present invention, as the stop is disposed in front of the lens groups, namely, at the position closest to the object, it functions to sufficiently distance the exit pupil position from the image-forming surface. Also, as the fourth lens group having a strong refractive power as a whole is disposed at the position closest to the image, the exit pupil position is further distanced from the image surface, thereby sufficiently reducing the incident angle with respect to the image pickup device.

Since the fourth lens group is an integrated lens in which a lens having a negative refractive power (negative lens) and a lens having a positive refractive power (positive lens) are cemented together, magnification chromatic aberration can be corrected thereby.

Also, since the second lens is constituted by a negative lens having a high refractive index while the third lens is constituted by a positive meniscus lens whose convex surface faces the image, a sufficient back focus is secured while spherical aberration and axial chromatic aberration can be corrected.

Further, when a light-shielding plate with an opening having a diameter identical to or slightly larger than that of the stop is disposed between the stop, which is closest to the object, and the lens groups, flare components of the luminous flux having an intermediate angle of view can be cut, thereby improving resolving power.

Also, as the above-mentioned conditions (1) to (6) are satisfied, a photographic lens apparatus which has a sufficiently large back focus while sufficiently securing the distance between the image-forming surface and the exit pupil position can be realized.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 3A to 3C are aberration charts respectively showing spherical aberration, astigmatism, and distortion in a second specific example of the present invention;

FIGS. 4A to 4C are aberration charts respectively showing spherical aberration, astigmatism, and distortion in a third specific example of the present invention;

DETAILED DESCRIPTION OF THE PREFERRED EMBODIMENTS

Figure 1:
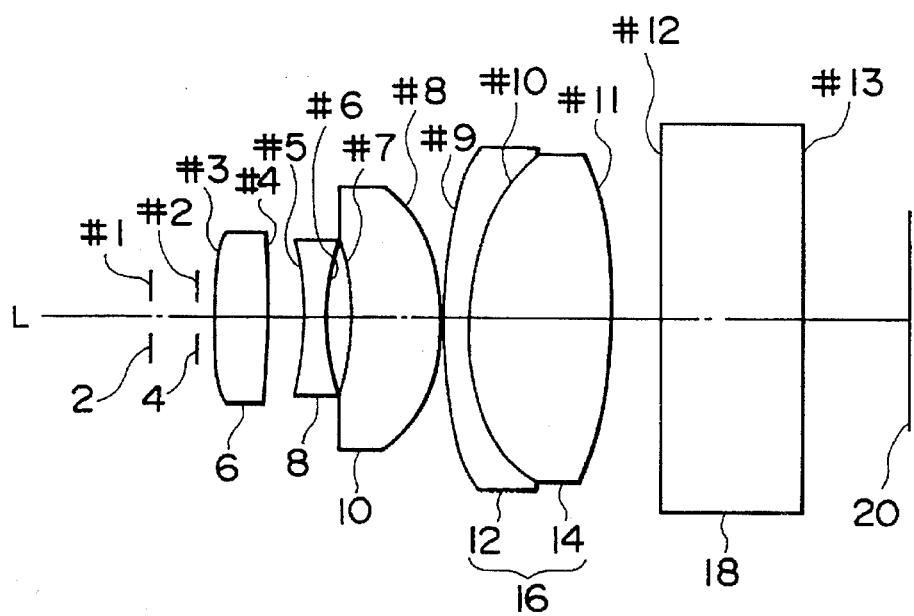
FIG. 1 is an explanatory view showing a basic configuration of the photographic lens apparatus in accordance with the present invention.

In the following, an embodiment of the photographic lens apparatus in accordance with the present invention will be explained. First, its basic configuration will be explained with reference to FIG. 1. The photographic lens apparatus in accordance with the present invention comprises, successively from the object side along an optical axis L, a stop 2, a light-shielding plate 4 for restricting a luminous flux having an intermediate angle of view, a biconvex first lens 6, a biconcave second lens 8, a third lens 10 having a meniscus form and a positive refractive power with a convex surface facing the image, and a fourth lens group 16 in which a lens 12 having a negative refractive power and a lens 14 having a positive refractive power are cemented together to yield a positive refractive power. Namely, it is mainly constituted by four lens groups composed of five elements. Further, in this embodiment, by way of a filter 18, an object image is formed on an image pickup surface (image-forming surface) 20 of such means as a CCD solid-state image pickup device.

Also, refractive index $n_1$ of the first lens 6, abbe number $v_1$ of the first lens 6, abbe number $v_2$ of the second lens 8, radius of curvature $r_7$ of the surface of the third lens 10 facing the object, radius of curvature $r_8$ of the surface of the third lens 10 facing the image, abbe number $v_4$ of the lens 12, abbe number $v_5$ of the lens 14, focal length $f_{45}$ of the fourth lens group 16 composed of the lenses 12 and 14, and entire focal length f of the whole lens system comprising the four groups composed of five elements satisfy the following conditions (1) to (6):

(1) $1.7 < n_1$ (2) $40 < v_1 < 50$ (3) $v_2 < 30$ (4) $9 < (r_7 + r_8)/(r_7 - r_8) < 50$ (5) $f_{45}/f < 1.20$ (6) $20 < v_5 - v_4$

In this configuration, as the stop 2 is disposed at the position closest to the object, the exit pupil position can be sufficiently distanced from the image-forming surface. Also, as the fourth lens group 16 having a strong refractive power as a whole is disposed at the position closest to the image, the exit pupil position is further distanced from the image surface, thereby sufficiently reducing the incident angle with respect to the image pickup device or the like. In addition, as the fourth lens group 16 is formed by the negative lens 12 and the positive lens 14 which are cemented together, magnification chromatic aberration is corrected.

Also, since the second lens 8 is constituted by a negative lens having a high refractive index while the third lens 10 is constituted by a positive meniscus lens whose convex surface faces the image, a sufficient back focus is secured while spherical aberration and axial chromatic aberration are corrected.

Further, the light-shielding plate 4 with an opening having a diameter identical to or slightly larger than that of the stop 2 is disposed between the stop 2, which is closest to the object, and the first lens group 6, whereby flare components of the luminous flux having an intermediate angle of view is cut so as to improve resolving power.

The above-mentioned condition (1) defines the refractive index $n_1$ of the first lens 6, below which spherical aberration may be insufficiently corrected. In order to improve spherical aberration without this condition, the diameter of the fourth lens group 16 must be increased, thereby unfavorably increasing the size of the whole lens apparatus.

Conditions (2) and (3) are mainly definitions for correcting axial chromatic aberration to an appropriate level. If an optical material lying outside of these ranges is selected, it will be difficult to attain a tolerable axial chromatic aberration, whereby high performances cannot be obtained.

Condition (4) defines the form of the third lens 10 by which a sufficient back focus can be secured while sufficiently distancing the exit pupil position from the image surface. When the value of $(r_7+r_8)/(r_7-r_8)$ exceeds its upper limit, the image surface may tilt in the positive direction, while the lens may have a shape which is hard to be processed. Below the lower limit, on the other hand, the exit pupil position may become close to the image surface, thereby necessitating a larger optical system to overcome this problem.

Condition (5) mainly defines the refractive power of the fourth lens group 16 which is necessary for attaining the exit pupil position. If the value of $f_{45}/f$ exceeds its upper limit, the refractive power needed for the fourth lens group 16 will not be attained, whereby the necessary exit pupil position cannot be obtained.

Condition (6) is mainly a definition for correcting chromatic aberration in magnification to an appropriate value.

In the following, a plurality of specific examples of this embodiment will be explained. Here, these specific examples satisfy the above-mentioned conditions (1) to (6) and have the basic configuration shown in FIG. 1 including the filter 18.

EXAMPLE 1

In the basic configuration of the photographic lens apparatus in accordance with the present invention shown in FIG. 1, the overall characteristics, namely, entire focal length f, F number FNo, and half angle of view ω of the whole lens system comprising four groups composed of five elements are as follows:

f=7.63 mm, FNo=3.43, ω=22.3°

Also, radius of curvature r of the surface corresponding to each of surface numbers #1 to #13 of the respective constituents, thickness or distance d of each constituent, and refractive index n and abbe number ν of each constituent are shown in the following Table 1.

TABLE 1

| | Surface No. | r | d | n | ν |
|---|---|---|---|---|---|
| Stop | #1 | ∞ | 1.30 | | |
| Light-shielding plate | #2 | ∞ | 0.40 | | |
| First lens | #3 | 8.200 | 1.37 | 1.80610 | 40.7 |
| | #4 | −11.300 | 0.92 | | |
| Second lens | #5 | −6.300 | 0.60 | 1.80518 | 25.5 |
| | #6 | 6.170 | 0.70 | | |

TABLE 1-continued

|  | Surface No. | r | d | n | v |
|---|---|---|---|---|---|
| Third lens | #7 | −5.050 | 2.38 | 1.80420 | 46.5 |
|  | #8 | −4.700 | 0.15 |  |  |
| Fourth lens group | #9 | 11.800 | 0.60 | 1.84666 | 23.8 |
|  | #10 | 6.400 | 3.68 | 1.77250 | 49.6 |
|  | #11 | −10.400 | 1.00 |  |  |
| Filter | #12 | ∞ | 3.62 | 1.51680 | 64.2 |
|  | #13 | ∞ |  |  |  |

Further, conditional values set so as to correspond to the above-mentioned conditions (1) to (6) are as follows:

$n_1 = 1.81$
$v_1 = 40.7$
$v_2 = 25.5$
$(r_7 + r_8)/(r_7 - r_8) = 27.8$
$f_{45}/f = 1.06$
$v_5 - v_4 = 25.8$

Figure 2A:
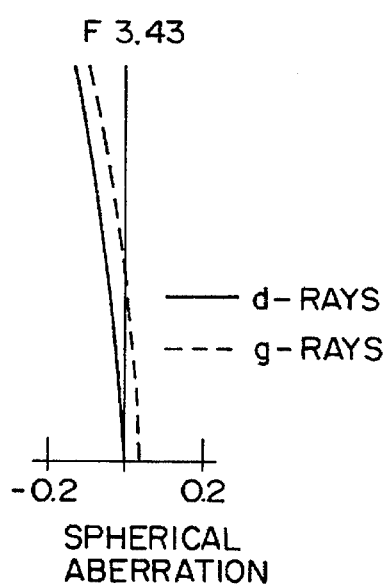
FIGS. 2A to 2C are aberration charts respectively showing spherical aberration, astigmatism, and distortion in a first specific example of the present invention.
Figure 2B:
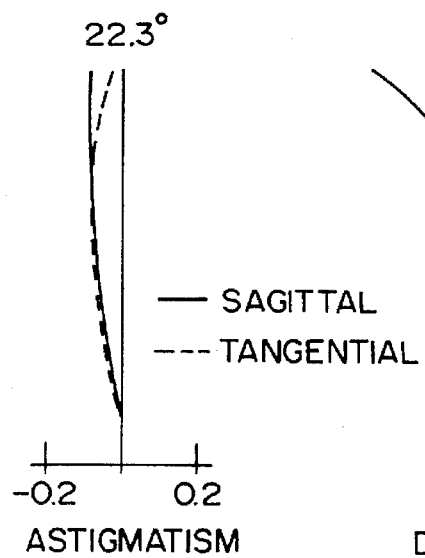
Figure 2C:
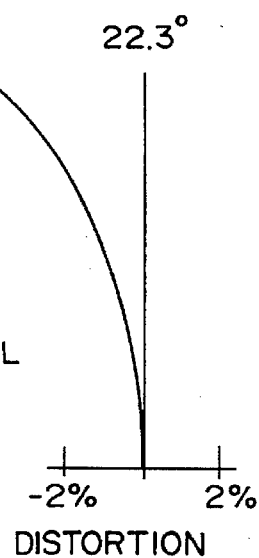

Also, FIGS. 2A to 2C are aberration charts for this specific example. Namely, FIG. 2A shows the spherical aberration with respect to d-rays (indicated by continuous curve) and that with respect to g-rays (indicated by dotted curve), FIG. 2B shows astigmatism with respect to a sagittal image surface (continuous curve) and that with respect to a tangential image surface (dotted curve), and FIG. 2C shows distortion.

EXAMPLE 2

In the basic configuration of the photographic lens apparatus in accordance with the present invention shown in FIG. 1, the overall characteristics, namely, entire focal length f, F number FNo, and half angle of view ω of the whole lens system comprising four groups composed of five elements are as follows:

f=7.64 mm, FNo=3.44, ω=22.3°

Also, radius of curvature r of the surface corresponding to each of surface numbers #1 to #13 of the respective constituents, thickness or distance d of each constituent, and refractive index n and abbe number v of each constituent are shown in the following Table 2.

TABLE 2

|  | Surface No. | r | d | n | v |
|---|---|---|---|---|---|
| Stop | #1 | ∞ | 1.30 |  |  |
| Light-shielding plate | #2 | ∞ | 0.40 |  |  |
| First lens | #3 | 7.890 | 1.14 | 1.80610 | 40.7 |
|  | #4 | −11.300 | 0.87 |  |  |
| Second lens | #5 | −6.300 | 0.60 | 1.80518 | 25.5 |
|  | #6 | 6.170 | 0.71 |  |  |
| Third lens | #7 | −5.050 | 2.51 | 1.80420 | 46.5 |
|  | #8 | −4.700 | 0.15 |  |  |
| Fourth lens group | #9 | 11.800 | 0.60 | 1.80518 | 25.5 |
|  | #10 | 6.400 | 3.76 | 1.73400 | 51.0 |
|  | #11 | −10.400 | 1.00 |  |  |
| Filter | #12 | ∞ | 3.62 | 1.51680 | 64.2 |
|  | #13 | ∞ |  |  |  |

Further, conditional values set so as to correspond to the above-mentioned conditions (1) to (6) are as follows:

$n_1 = 1.81$
$v_1 = 40.7$
$v_2 = 25.5$
$(r_7 + r_8)/(r_7 - r_8) = 27.9$
$f_{45}/f = 1.19$
$v_5 - v_4 = 25.5$

Also, FIGS. 3A to 3C are aberration charts for this specific example. Namely, FIG. 3A shows the spherical aberration with respect to d-rays (indicated by continuous curve) and that with respect to g-rays (indicated by dotted curve), FIG. 3B shows astigmatism with respect to a sagittal image surface (continuous curve) and that with respect to a tangential image surface (dotted curve), and FIG. 3C shows distortion.

EXAMPLE 3

In the basic configuration of the photographic lens apparatus in accordance with the present invention shown in FIG. 1, the overall characteristics, namely, entire focal length f, F number FNo, and half angle of view ω of the whole lens system comprising four groups composed of five elements are as follows:

f=7.64 mm, FNo=3.43, ω=22.2°

Also, radius of curvature r of the surface corresponding to each of surface numbers #1 to #13 of the respective constituents, thickness or distance d of each constituent, and refractive index n and abbe number v of each constituent are shown in the following Table 3.

TABLE 3

|  | Surface No. | r | d | n | v |
|---|---|---|---|---|---|
| Stop | #1 | ∞ | 1.30 |  |  |
| Light-shielding plate | #2 | ∞ | 0.40 |  |  |
| First lens | #3 | 7.007 | 1.22 | 1.71270 | 43.3 |
|  | #4 | −11.604 | 0.96 |  |  |
| Second lens | #5 | −6.376 | 0.61 | 1.78470 | 25.7 |
|  | #6 | 6.100 | 0.75 |  |  |
| Third lens | #7 | −4.992 | 2.33 | 1.80420 | 46.5 |
|  | #8 | −4.588 | 0.15 |  |  |
| Fourth lens group | #9 | 11.364 | 0.60 | 1.84666 | 23.8 |
|  | #10 | 6.791 | 3.62 | 1.77250 | 49.6 |
|  | #11 | −11.321 | 1.00 |  |  |
| Filter | #12 | ∞ | 3.62 | 1.51680 | 64.2 |
|  | #13 | ∞ |  |  |  |

Further, conditional values set so as to correspond to the above-mentioned conditions (1) to (6) are as follows:

$n_1 = 1.72$
$v_1 = 43.3$
$v_2 = 25.7$
$(r_7 + r_8)/(r_7 - r_8) = 23.7$
$f_{45}/f = 1.07$
$v_5 - v_4 = 25.8$

Also, FIGS. 4A to 4C are aberration charts for this specific example. Namely, FIG. 4A shows the spherical aberration with respect to d-rays (indicated by continuous curve) and that with respect to g-rays (indicated by dotted curve), FIG. 4B shows astigmatism with respect to a sagittal image surface (continuous curve) and that with respect to a tangential image surface (dotted curve), and FIG. 4C shows distortion.

EXAMPLE 4

In the basic configuration of the photographic lens apparatus in accordance with the present invention shown in FIG.

1, the overall characteristics, namely, entire focal length f, F number FNo, and half angle of view ω of the whole lens system comprising four groups composed of five elements are as follows:

f=7.64 mm, FNo=3.44, ω=22.5°

Also, radius of curvature r of the surface corresponding to each of surface numbers #1 to #13 of the respective constituents, thickness or distance d of each constituent, and refractive index n and abbe number ν of each constituent are shown in the following Table 4.

TABLE 4

| | Surface No | r | d | n | ν |
|---|---|---|---|---|---|
| Stop | #1 | ∞ | 1.30 | | |
| Light-shielding plate | #2 | ∞ | 0.40 | | |
| First lens | #3 | 8.263 | 1.20 | 1.80610 | 40.7 |
| | #4 | −11.305 | 0.82 | | |
| Second lens | #5 | −6.702 | 0.61 | 1.80518 | 25.5 |
| | #6 | 5.920 | 0.81 | | |
| Third lens | #7 | −6.900 | 2.76 | 1.80420 | 46.5 |
| | #8 | −5.644 | 0.15 | | |
| Fourth lens | #9 | 13.598 | 0.60 | 1.84666 | 23.8 |
| group | #10 | 6.833 | 3.60 | 1.77250 | 49.6 |
| | #11 | −9.899 | 1.00 | | |
| Filter | #12 | ∞ | 3.62 | 1.51680 | 64.2 |
| | #13 | ∞ | | | |

Further, conditional values set so as to correspond to the above-mentioned conditions (1) to (6) are as follows:

$n_1=1.81$ $\nu_1=40.7$ $\nu_2=25.5$ $(r_7+r_8)/(r_7-r_8)=10.0$ $f_{45}/f=1.11$ $\nu_5-\nu_4=25.8$

Figure 5A:
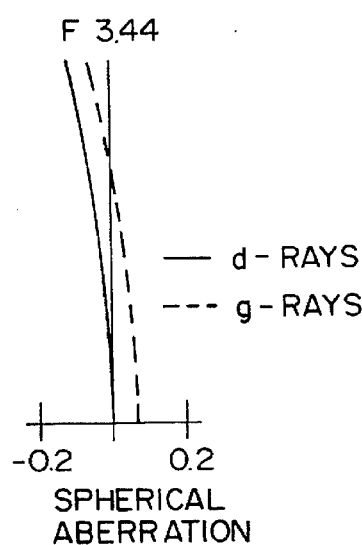
FIGS. 5A to 5C are aberration charts respectively showing spherical aberration, astigmatism, and distortion in a fourth specific example of the present invention.
Figure 5B:
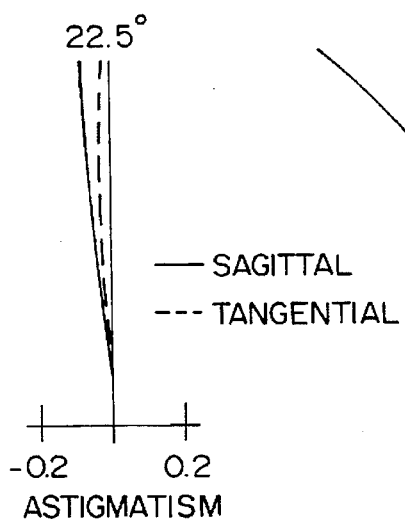
Figure 5C:
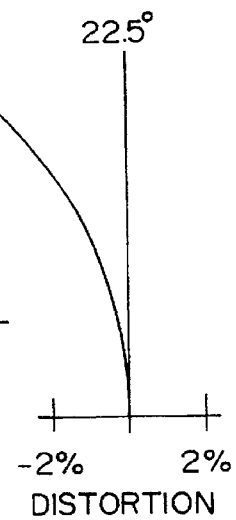

Also, FIGS. 5A to 5C are aberration charts for this specific example. Namely, FIG. 5A shows the spherical aberration with respect to d-rays (indicated by continuous curve) and that with respect to g-rays (indicated by dotted curve), FIG. 5B shows astigmatism with respect to a sagittal image surface (continuous curve) and that with respect to a tangential image surface (dotted curve), and FIG. 5C shows distortion.

EXAMPLE 5

In the basic configuration of the photographic lens apparatus in accordance with the present invention shown in FIG. 1, the overall characteristics, namely, entire focal length f, F number FNo, and half angle of view ω of the whole lens system comprising four groups composed of five elements are as follows:

f=7.64 mm, FNo=3.44, ω=22.2°

Also, radius of curvature r of the surface corresponding to each of surface numbers #1 to #13 of the respective constituents, thickness or distance d of each constituent, and refractive index n and abbe number ν of each constituent are shown in the following Table 5.

TABLE 5

| | Surface No. | r | d | n | ν |
|---|---|---|---|---|---|
| Stop | #1 | ∞ | 1.30 | | |
| Light-shielding plate | #2 | ∞ | 0.40 | | |
| First lens | #3 | 8.268 | 1.45 | 1.80610 | 40.7 |
| | #4 | −11.839 | 0.94 | | |
| Second lens | #5 | −6.334 | 0.60 | 1.80518 | 25.5 |
| | #6 | 6.091 | 0.70 | | |
| Third lens | #7 | −4.700 | 2.38 | 1.80420 | 46.5 |
| | #8 | −4.503 | 0.15 | | |
| Fourth lens | #9 | 11.752 | 0.60 | 1.84666 | 23.8 |
| group | #10 | 6.734 | 3.66 | 1.77250 | 49.6 |
| | #11 | −10.590 | 1.00 | | |
| Filter | #12 | ∞ | 3.62 | 1.51680 | 64.1 |
| | #13 | ∞ | | | |

Further, conditional values set so as to correspond to the above-mentioned conditions (1) to (6) are as follows:

$n_1=1.81$ $\nu_1=40.7$ $\nu_2=25.5$ $(r_7+r_8)/(r_7-r_8)=46.8$ $f_{45}/f=1.06$ $\nu_5-\nu_4=25.8$

Figure 6A:
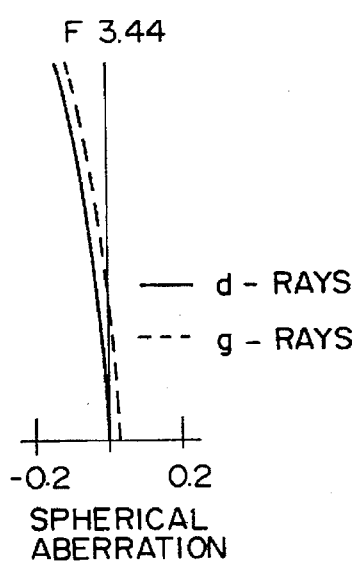
FIGS. 6A to 6C are aberration charts respectively showing spherical aberration, astigmatism, and distortion in a fifth specific example of the present invention.
Figure 6B:
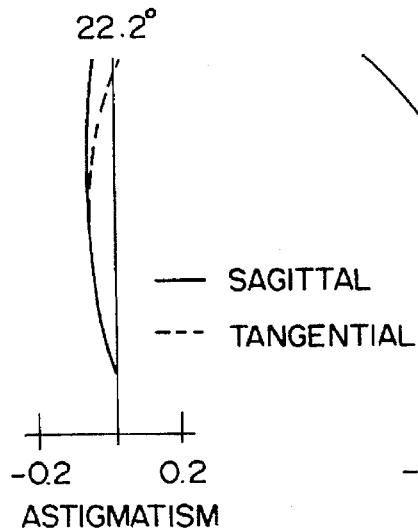
Figure 6C:
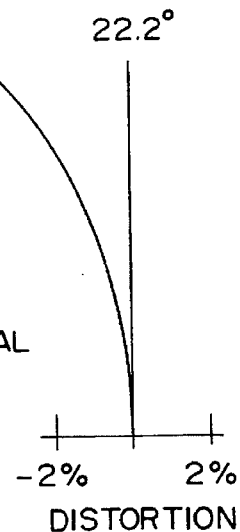

Also, FIGS. 6A to 6C are aberration charts for this specific example. Namely, FIG. 6A shows the spherical aberration with respect to d-rays (indicated by continuous curve) and that with respect to g-rays (indicated by dotted curve), FIG. 6B shows astigmatism with respect to a sagittal image surface (continuous curve) and that with respect to a tangential image surface (dotted curve), and FIG. 6C shows distortion.

As explained in the foregoing, in accordance with the present invention, a high-performance photographic lens apparatus which has a sufficiently large back focus while sufficiently securing the distance between the image-forming surface and the exit pupil position can be realized, thereby providing a photographic lens apparatus suitable for video cameras and electronic still cameras, for example.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A photographic lens apparatus comprising four lens groups of five elements comprising, successively from an object side, a stop, a biconvex first lens, a biconcave second lens, a third lens having a meniscus form and a positive refractive power with a convex surface facing an image, and a fourth lens group in which a lens having a negative refractive power and a lens having a positive refractive power are cemented together to yield a positive refractive power, refractive index $n_1$ of said first lens, abbe number $\nu_1$ of said first lens, abbe number $\nu_2$ of said second lens, radius of curvature $r_7$ of the surface of said third lens facing said object, radius of curvature $r_8$ of the surface of said third lens facing said image, abbe number $\nu_4$ of the lens having the negative refractive power in said fourth lens group, abbe number $\nu_5$ of the lens having the positive refractive power in said fourth lens group, focal length $f_{45}$ of said fourth lens group, and entire focal length f of the whole lens system comprising said four groups composed of five elements satisfying the following conditions (1) to (6):

(1) $1.7 < n_1$
(2) $40 < v_1 < 50$
(3) $v_2 < 30$
(4) $9 < (r_7+r_8)/(r_7-r_8) < 50$
(5) $f_{45}/f < 1.20$
(6) $20 < v_5 - v_4$.

2. A photographic lens apparatus according to claim 1, wherein a light-shielding plate for restricting a luminous flux having an opening having a diameter identical to or slightly larger than that of the stop is disposed between said stop and said first lens.

* * * * *